United States Patent [19]

Mikami et al.

[11] Patent Number: 4,712,854

[45] Date of Patent: Dec. 15, 1987

[54] OPTICAL WAVEGUIDE AND METHOD OF MAKING THE SAME

[75] Inventors: Kazuo Mikami, Kyoto; Tsukasa Yamashita, Nara; Mitsutaka Katoh, Kyoto, all of Japan

[73] Assignee: Omron Tateisi Electronics Co., Kyoto, Japan

[21] Appl. No.: 629,442

[22] Filed: Jul. 10, 1984

[30] Foreign Application Priority Data

Jul. 11, 1983 [JP] Japan .................. 58-126547
Jul. 12, 1983 [JP] Japan .................. 58-127489

[51] Int. Cl.$^4$ .................................. G02B 6/10
[52] U.S. Cl. .......................... 350/96.12; 350/96.29; 350/96.10
[58] Field of Search ............. 350/96.12, 96.13, 96.14, 350/96.29, 96.30, 96.31, 96.32, 96.33, 96.34

[56] References Cited

U.S. PATENT DOCUMENTS

| | | | |
|---|---|---|---|
| 3,864,130 | 2/1975 | Nassenstein et al. | 350/96.11 X |
| 4,130,342 | 12/1978 | McMahon | 350/96.14 |
| 4,480,182 | 10/1984 | Ely et al. | 350/96.15 |
| 4,511,206 | 4/1985 | Thylen et al. | 350/96.14 X |
| 4,514,037 | 4/1985 | Bishop et al. | 350/96.34 X |
| 4,521,351 | 6/1985 | Ohtsuka et al. | 350/96.34 X |
| 4,544,235 | 10/1985 | Nishida et al. | 350/96.30 X |
| 4,547,040 | 10/1985 | Yamamoto et al. | 350/96.30 X |
| 4,549,781 | 10/1985 | Bhagavatula et al. | 350/96.30 |
| 4,593,974 | 6/1986 | Yamamoto et al. | 350/96.34 |
| 4,593,975 | 6/1986 | Nakauchi et al. | 350/96.34 |

*Primary Examiner*—William L. Sikes
*Assistant Examiner*—Akm E. Ullah
*Attorney, Agent, or Firm*—Stevens, Davis, Miller & Mosher

[57] ABSTRACT

A method of making an optical waveguide. First ultraviolet light is radiated upon the surface of a transparent piece of photopolymerization material of a type whose refractive index is changed by the impact of ultraviolet light thereon, so that a refractive index profile in the depthwise direction of the piece of photopolymerization material is formed. Next ultraviolet light is radiated upon the surface of the transparent piece of photopolymerization material in a pattern of a lengthwise extending stripe whose intensity is least in its central portion and becomes greater towards its edge portions, so that a refractive index profile in the widthwise direction of the piece of photopolymerization material is formed. Finally an optical waveguide is structured from the thus irradiated piece of photopolymerization material. Optionally, these profiles may be parabolic profiles. Optionally, also, the structuring of the final optical waveguide may be done by laminating together two similar such pieces of photopolymerization material, thus treated, with their sides which were exposed to ultraviolet radiation in contact with one another.

6 Claims, 23 Drawing Figures

OPTICAL WAVEGUIDE AND METHOD OF MAKING THE SAME

BACKGROUND OF THE INVENTION

The present invention relates to an optical waveguide and a method of making the same, and more particularly relates to an optical waveguide consisting of a photopolymerization material whose refractive index may be adjusted according to the intensity of the ultraviolet light which is radiated thereon and a method of making the same.

A certain aspect of this invention relates to an optical waveguide of a multi mode refractive index distribution type, such as is suitable for connection to a graded index type optical fiber and a method of making the same. Another aspect of this invention relates to an optical waveguide which has a parabolic profile of refractive index in both its cross sectional directions. Yet another aspect of this invention relates to an optical waveguide of a large crosssectional area consisting of a plurality of layers of a photopolymerization material and a method of making the same.

Conventionally, in making an optical waveguide, a high polymer material has been used and by selective photopolymerization of the polymer material a waveguide path has been produced therein. However, an optical waveguide made in this conventional way either has a limited thickness or an uncontrolled refractive index profile because of the attenuation of the ultraviolet light which is effective for the photopolymerization of the material. What is desired in this conjunction is a step index type optical waveguide of a large cross- c sectional dimension in which the index of refraction of the core portion thereof is substantially constant across its cross section. Alternatively, what is desired is an optical waveguide which has a certain controlled graded refractive index profile, for instance a parabolic profile, along both its cross sectional directions. Either one of such optical waveguides has good matching characteristics relative to an optical fiber of a particular type, the former having a good matching relative to a step index type optical fiber, the latter having a good matching relative to a graded index type optical fiber. A bad matching can result in increase of transmission losses, transmission delays and so on due to scattering of light.

Specifically, according to a broad concept of the present invention, an optical waveguide of the graded index type may be made by superposing a mask, which has a mask pattern formed in a stripe whose width corresponds to the width of the optical waveguide to be formed, over a film of polymerizable material which is formed for instance by a casting process, and by then irradiating the combination with rays of ultraviolet light. Thereby, the part of the film which is not covered by the pattern of the mask is illuminated by the ultraviolet light and is subjected to polymerization, thus substantially decreasing its refractive index and forming a so-called clad portion on either side of the part of the film which is covered by the pattern of the mask, which forms a so-called core portion, being itself protected from the effect of the ultraviolet light and so being left in its base or low polymer state wherein its refractive index is high.

On the other hand, when a matching with a step index optical fiber is considered, it is desirable to have an optical waveguide having a substantially flat refractive index profile in both sectional directions. It may be possible to achieve such a profile along the widthwise direction simply by radiating ultraviolet light of two different intensities on a certain photopolymerizable material but not in the depthwise direction because of the fact that the ultraviolet light with which the photopolymerization material is irradiated for polymerization gets attenuated as it penetrates the photo-polymerization material along its depthwise direction. As a result, in an optical waveguide thus obtained without the benefit of the inventive concept of this invention, the difference in the refraction index between the clad portion and the core portion is substantially smaller in the reverse surface than in the front surface. This, which is caused by the fact that, as mentioned above, the intensity of the ultraviolet light tends to be attenuated towards the reverse surface due to the phase separation of the base material and the monomer in the photopolymerization regions, damages the capacity of the reverse surface in confining light, thereby causing the increase in the transmission loss of the otical waveguide.

SUMMARY OF THE INVENTION

Accordingly, it is the primary object of the present invention to provide an optical waveguide, which can form an optical waveguide made of photopolymerization material which has a parabolic profile of refractive index in both its cross sectional directions a method of making the same.

It is a further object of the present invention to provide such an optical waveguide, which has very good matching characteristics with respect to an optical fiber of the sort described above the core portion of which has a substantially parabolic refractive index profile in both its cross sectional directions and a method of making the same.

It is a further object of the present invention to provide such an optical waveguide, which in combination with an optical fiber provides low mode scattering.

It is a yet further object of the present invention to provide such an optical waveguide, which in combination with an optical fiber provides low delay in optical signal transmission.

It is a yet further object of the present invention to provide such an optical waveguide, which in combination with an optical fiber provides low wave form distortion.

It is a further object of the present invention to provide an optical waveguide, which is suitable for making a waveguide of a large cross-sectional area.

According to the most general aspect of the present invention, these and other objects are accomplished by providing an optical waveguide comprising a material whose refractive index may be varied according to the progress of photopolymerization of the material and the refractive index of the optical waveguide has a substantially parabolic profile in both directions across its cross-section through selective photopolymerization of the material, and an optical waveguide comprising a plurality of thin film layers each having a first area having a first refractive index and serving as a core portion and a second area having a second refractive index and serving as a clad portion in such manner that the optical waveguide is defined along a line parallel to the planes of the layers.

The former optical waveguide may be made by first performing a first process of radiating ultraviolet light upon the surface of a piece of photopolymerization material whose refractive index is changed by the impact of ultraviolet light thereon, and thereby forming a refractive index profile in the depthwise direction of said piece of photopolymerization material, subsequently performing a second process of radiating ultraviolet light upon said surface of said piece of photopolymerization material in a pattern of a lengthwise extending stripe whose intensity is least in its central portion and becomes greater towards its edge portions, and thereby forming a refractive index profile in the widthwise direction of said piece of photopolymerization material, and finally structuring an optical waveguide from said thus irradiated piece of photopolymerization material, and the latter optical waveguide may be made by radiating ultraviolet light on a layer of photopolymerization material in a selective manner so as to form an area having a first refractive index which serves as a core portion and other area having a second refractive index which serves as a clad portion, forming at least one more layer of a substantially same photopolymerization material over said layer of photopolymerization material, and radiating ultraviolet light on the additional layer of the photopolymerization material so as to form areas having the first refractive index and the second refractive index therein, thereby forming a waveguide path along a line parallel to the plane of the layers.

BRIEF DESCRIPTION OF THE DRAWINGS

The present invention will now be shown and described with reference to the preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENT

The present invention will now be described with reference to the preferred embodiment thereof, and with reference to the appended drawings.

Figure 1:
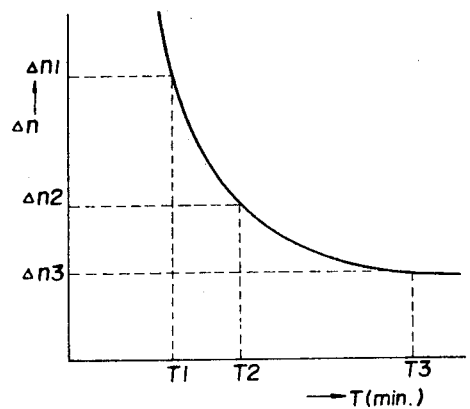
FIG. 1 is a graph showing the change of refractive index relative to evaporation time of a casting solution.

FIG. 1 shows a relationship of the change of the index of refraction after photopolymerization relative to the time of evaporation of a casting solution.

As shown in the drawing, the shorter the time of evaporation, the smaller the evaporation of the solvent and the monomer is, or the greater the monomer contained, the greater the change $\Delta_n$ of the refraction index after photopolymerization becomes. And conversely, the longer the time of evaporation is, the smaller the change $\Delta_n$ of the refraction index becomes. In other words, generally speaking, the following relationship holds:

$$\Delta_{n1} > \Delta_{n2} > \Delta_{n3}$$
$$\text{for } T_1 < T_2 < T_3$$

Furthermore, the shorter the evaporation time, the greater the change of the refraction index of the surface of the film after photopolymerization becomes, but since the scattering due to the phase separation of the base material and the monomer is great and ultraviolet light cannot penetrate through the depth, the change of refraction index near the reverse surface of the film is sharply reduced. Therefore, the refraction index is distributed in such a way that the difference in the refraction index across the interface between the core portion and the clad portion is greater near the surface and is drastically reduced near the reverse surface or there is a substantial change in the differece in the refraction index across the interface along the depthwise direction of the film while there is substantially no change in the difference in refraction index across the interface along the lengthwise direction of the core portion. In other words, the distribution of refraction index along the depthwise direction is not substa tially constant while, on the other hand, the distribution of refraction index along the widthwise direction of the core portion is substantially constant and presents a step index type.

Figure 2A:
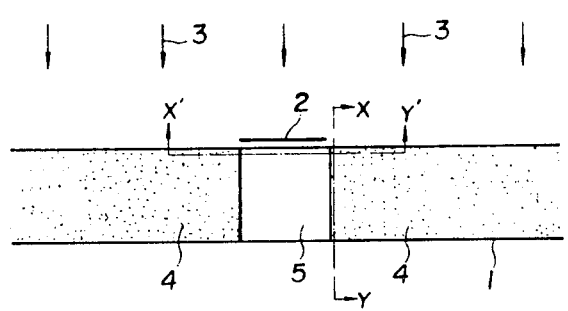
FIG. 2 is a view showing the change of refractive index when the evaporation time is shortened, FIG. 2a showing a sectional view of an optical waveguide, FIG. 2b showing a distribution of refractive index along the depthwise direction, FIG. 3b showing a distribution of refractive index along the widthwise direction.
Figure 2B:
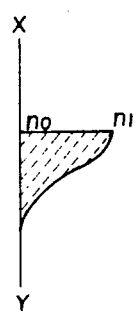
Figure 2C:
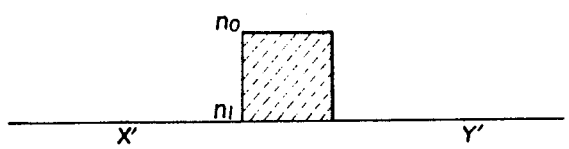

The shorter the evaporation time, the change of the refraction index of the surface of the film after photopolymerization becomes greater, but since the scattering due to the phase separation of the base material and the monomer is great and ultraviolet light cannot penetrate through the depth, the change of refraction index near the reverse surface of the film is sharply reduced. The distribution of refraction index along the depthwise direction and the widthwise direction of the optical waveguide path which is obtained through photopolymerization by shortening only the evaporation time and using a film as shown in FIG. 2a is given as shown in FIGS. 2b and 2c. As can be clearly seen from FIG. 2b, the refraction index is distributed in such a way that the difference in the diffraction index across the interface between the core portion 5 and the clad portion 4 is greater near the surface and is drastically reduced near the reverse surface. In other words, the distribution of refraction index along the depthwise direction is close to a substantially parabolic distribution. On the other hand, the distribution of refraction index along the widthwise direction of the core portion 5 is fixed as shown in FIG. 2, and presents a step index type.

Figure 3:
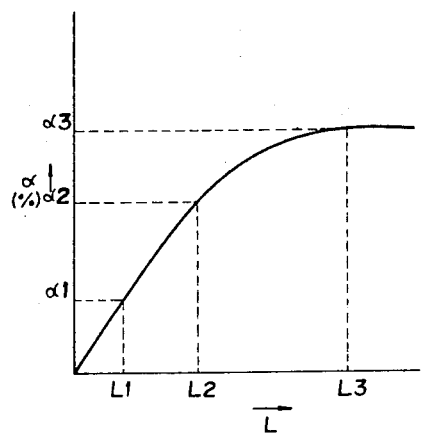
FIG. 3 is a graph showing the change of polymerization ratio with respect to the amount of ultraviolet irradiation performed.

FIG. 3 shows a relation between the amount of radiation of ultraviolet light L and photopolymerization ratio α. As shown in the figures, the greater the radiation amount L is, the greater the photopolymerization ratio α becomes. With the increase in the radiation amount of ultraviolet light, the polymerization of the base material and the monomer advances and the change of refraction index after photopolymerization relative to that of the base material becomes greater. In other words, the refraction index may be controlled by the radiation amount of ultraviolet light.

This invention makes use of two principles, one being that a refraction index distribution of substantially parabolic distribution may be obtained along the depthwise direction through photopolymerization after a short evaporation time and the other principle being that the photopolymerization ratio changes according to the radiation amount of ultraviolet light, thereby providing various refractive indices.

Figure 4:
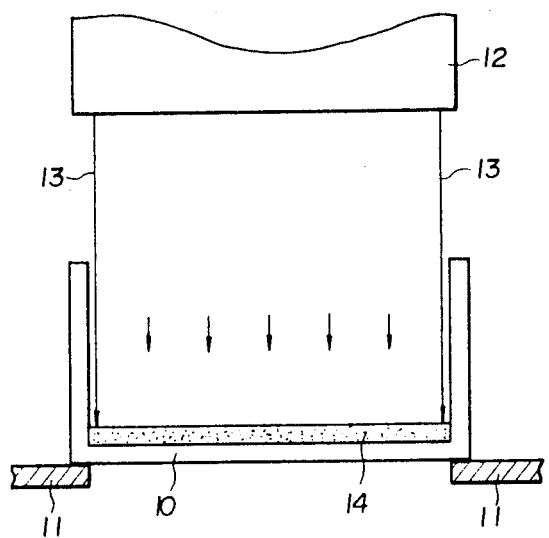
FIG. 4 is a sectional view of an apparatus which is being used for performing a preferred embodiment of the method of the present invention.

FIG. 4 shows a sectional view of part of an apparatus for practicing the method of the present invention. In the drawing, 10 is a cast container, 11 is a level for keeping the cast solution in the cast container 10 in horizontal orientation, and 12 is an ultraviolet light exposure device for generating a parallel ultraviolet light 13.

The first step in the method of the present invention is to prepare a casting mixture for making the waveguide which is suitable for forming a parabolic profile of refractive index along the depthwise direction. To this end, a cast solution is poured into the cast container 10 which has been washed in advance, for instance, using methylen chloride $CH_2Cl_2$. As an example, a cast solution may be prepared by using 70 gm of bisphenol Z-type polycarbonate (PCZ) as base material, 42 milliliters of methyl acrylate as monomer, 1,000 gm of methylene chloride ($CH_2Cl_2$) as solvent, 2.1 gm of benzoine ethyl ether (BZEE) as photobooster, and 0.07 gm of hydroquinone (HQ) as inhibitor, all mixed together.

Now, this casting mixture is poured into a casting container 10, as shown in FIG. 4, so as to form a layer of solution therein of thickness about 100 micrometers. By adjusting a leveling device 11 on which the casting container 10 rests, the level of the casting mixture is made to be substantially the same all over the bottom of the casting container 10.

Next, while keeping the casting container 10 in a semi enclosed state, nitrogen gas is flowed therethrough over the surface of the casting liquid therein at a flow rate of about 100 milliliters per minute for approximately 100 minutes, and thereafter monomer vapor is flowed through the casting container 10 in the same way for about 20 minutes. Thus, after evaporating the solvent and part of the monomer, a film 14 as shown in FIG. 4 in the form of a semi solid transparent sheet is formed on the bottom of the casting container 10.

Next, a device 12 for producing ultraviolet light is suspended over the casting container 14 and is activated, and a parallel beam 13 of ultraviolet light is projected therefrom down against the upper surface of the film 14 in the container 10. This exposure is continued for about 5 minutes.

Figure 5A:
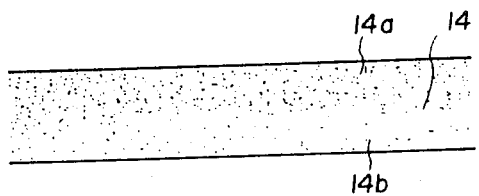
FIG. 5 in its view (a) shows a section of a film produced by the first step of the preferred embodiment of the method of the present invention, with polymerization amount shown by shading, and in its view (b) shows the profile in the depthwise direction of the refractive index thereof.
Figure 5B:
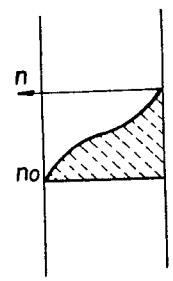

In FIG. 5a, a section of the film 14 at this stage in the process is shown, and in FIG. 5b the profile at this stage with regard to depth of the refractive index of the material thereof is illustrated. In fact, during this first phase of ultraviolet illumination, the photopolymerization produced thereby is most active near the upper surface 14a which was directly exposed to the ultraviolet of the film 14, and accordingly the refractive index of the film 14 is made lower at this upper surface 14a; while, because of the ultraviolet radiation scattering process in the film, the intensity of the photopolymerization diminishes according to depth in the film away from said upper surface 14a, to become substantially zero at the lower surface 14b of the film 14, accordingly leaving the refractive index near this lower surface 14a substantially unaltered and therefore the same as that of the PCZ basic material. And thus between the upper surface 14a and the lower surface 14b of the film 14 there is created a substantially half parabolic refractive index profile, as shown in FIG. 5b.

Next, after this exposure of the film 14 to the ultraviolet light, nitrogen gas is further flowed through the container 10 over the surface of the film 14 for approximately an additional 50 minutes at the rate of approximately 100 milliliters per minute, and then further monomer vapor is flowed through the casting container 10 in the same way for about 20 minutes. Thus, the solvent and part of the monomer is further evaporated.

Figure 6A:
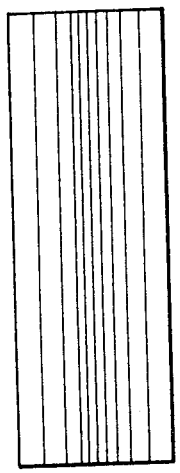
FIG. 6 in its view (a) shows a masking plate used in said preferred embodiment, and in its view (b) shows the profile in the widthwise direction of the amount of ultraviolet light transmitted therethrough.
Figure 6B:
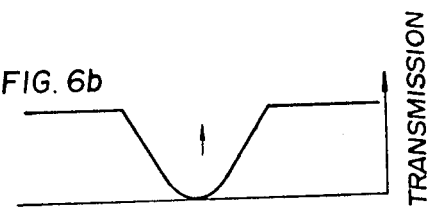
Figure 7:
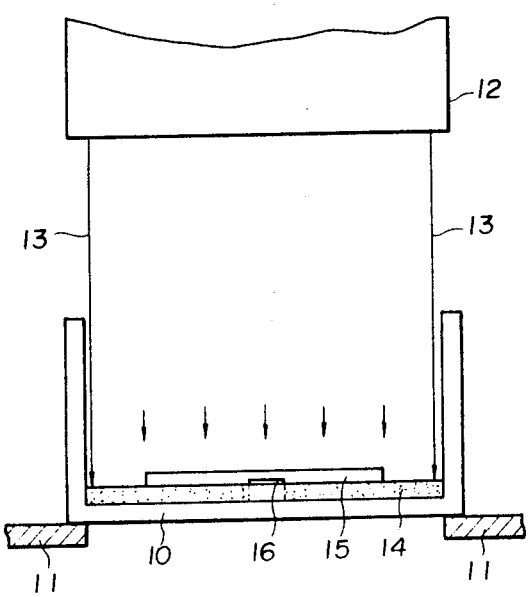
FIG. 7 is a sectional view of the apparatus of FIG. 6 in another stage of performing said preferred embodiment of the method of the present invention.

Next, as shown in FIG. 7, again the device 12 for producing ultraviolet light is suspended over the casting container 14, but this time with a mask plate 15 being laid over the upper surface 14a of the film 14 in the container 10. The mask plate 15 is particularly shown in FIG. 6a, and has a mask pattern 16 formed on it which is extended in a stripe shape about 200 micrometers wide in the lengthwise direction and which is denser (in the sense of transmitting less light: the mask pattern 16 may in fact be a diffraction pattern) in the middle of said stripe portion and becomes lighter towards the edges of said stripe portion. Thus, as shown in FIG. 6b, the transmission of ultraviolet light through the mask plate 15 is less towards the center of the stripe portion and is greater towards the edge portions of said stripe portion. Such a mask pattern may for instance be provided by forming a density gradation by combining chromium mask patterns with diameters of the order of 0.1 micrometers. The part of the film 14 covered by this stripe portion of the mask pattern 16 will hereinafter be called the core portion, because it will become the core portion of the optical waveguide which is being formed.

Next, after the evaporation time has been allowed to become sufficiently long, so that the phase separation of the base material and the monomer in the film 14 has been substantially eliminated, the device 12 is again activated, and again the parallel beam 13 of ultraviolet light is projected therefrom down against the mask plate 15 and the upper surface of the film 14 in the container 10. As a result, the central part of the core portion on the film 14 is not much exposed to ultraviolet light, i.e. is exposed to very weak ultraviolet light, but the outer parts of the core portion are subjected to more ultraviolet light, according to their distance from said central portion; and the other parts of the film 14 which are not covered at all by the mask pattern 16 are very much subjected to ultraviolet light, to such an extent that the ultraviolet light reaches the lower surface 14b of the film 14 over these portions thereof.

Thus, the variation with respect to width of the refractive index produced in this step is superimposed on the variation with respect to depth produced in the first illumination with ultraviolet light. Thus, a substantially parabolic refractive index profile is produced on the film 14 with respect to its widthwise direction, symmetrical about the center of the stripe portion of the mask pattern 16 and thus of the core portion, and still there remains a substantially half parabolic refractive index profile in the film 14 with respect to its depthwise direction.

Next, the film 14 is left alone by itself at room temperature for more than 30 minutes in order to finish it off by post processing, and then it is put into a vacuum drier (not particularly shown) along with the casting container 10, for being subjected to a drying process for about 10 hours at about 90° C.

Figure 8A:
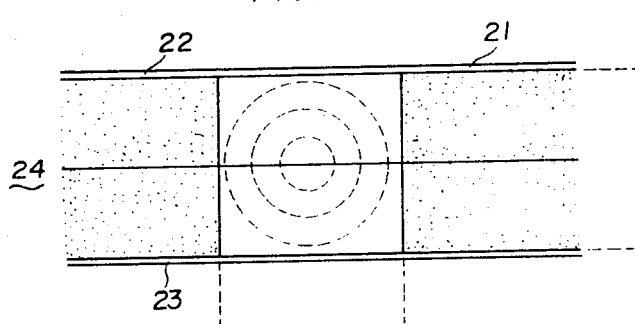
FIG. 8 relates to the optical waveguide made according to the method of the present invention, and shows in view (a) a sectional view of said optical waveguide, in view (b) the profile in the depthwise direction of the refractive index thereof, and in view (c) the profile in the widthwise direction of said refractive index thereof.

Next, a coating agent of low refractive index is coated on the lower or rear surface 14b of the film, in a thickness of about 10 micrometers, so as to form a coating layer 21 as shown in FIG. 8a, and this layer is dried for about 5 hours at a temperature of about 90° C. in a hot air drier.

Figure 8B:
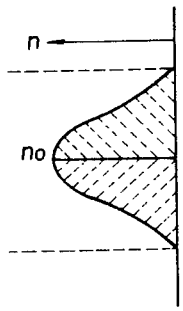
Figure 8C:
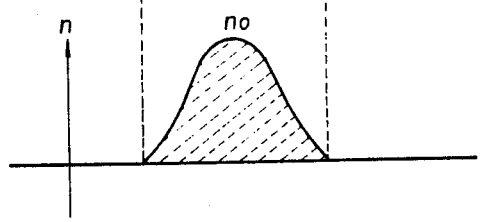

Two films 22 and 23 are made like this, and then their upper or front surface 14a, i.e. their surfaces which were exposed to the ultraviolet light, are overlaid together, with the core portions on the films 22 and 23 extending along and parallel to one another. As this is done, a refractive index adjusting agent is spread between the films 22 and 23. As a result, as shown in FIG. 8a, an optical waveguide 24 is obtained whose core portion is about 200 by 200 micrometers in dimension, and the refractive index profiles of which with respect to the depthwise and widthwise directions are as shown in FIGS. 8b and 8c, i.e. are both substantially parabolic. In other words, the two half parabolic refractive index profiles with respect to the depthwise direction of the two films made as explained above are combined to produce a full parabolic profile of the sandwiched combination thereof.

Since the resultant optical waveguide has a substantially parabolic refractive index profile in both of its transverse directions, it is suitable for being connected to a graded index optical fiber of large diameter, for example one with a core diameter of 200 micrometers, and provides good matching in such a case.

In the above described preferred embodiment, the thin film was made by a casting method, but other types of method are also applicable for forming the film, such as the use of a centrifuge or the like. Further, although a mask plate was used for providing an appropriate distribution of refractive index along the widthwise direction, it would also be possible to selectively modulate and deflect laser light and to direct it onto the film, to achieve the same result. Further, although in the shown preferred embodiment first two films were made, and then as a last stage they were adhered together by their exposed faces to make the final optical waveguide, as an alternative the final optical waveguide path could be made in an integrated fashion, by simultaneously exposing both its front and its rear faces to the ultraviolet light. Yet further, although in the shown preferred embodiment an optical waveguide of a thin film configuration was made, the present invention is not to be considered as limited to this, and it is possible to make an optical waveguide of a thick film configuration or a bulk configuration by using the principle of the present invention.

Figure 9A:
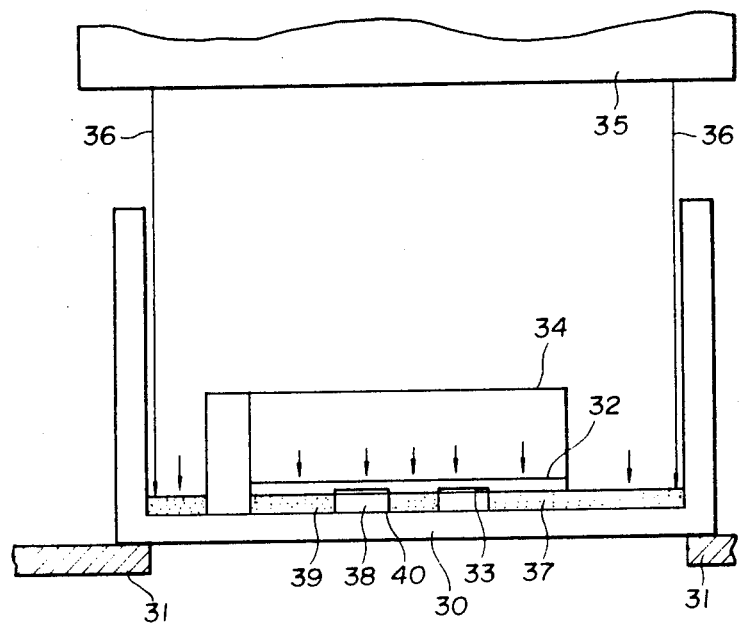
FIGS. 9 and 10 in their views (a) show sectional views showing a step of an embodiment of the method of this invention, in their views (b) show graphs of distributions of the intensity of ultraviolet light at the corresponding steps, and in their views (c) show graphs showing the distribution of refraction index differences along the depthwise direction of the optical waveguide at the corresponding steps.
Figure 10A:
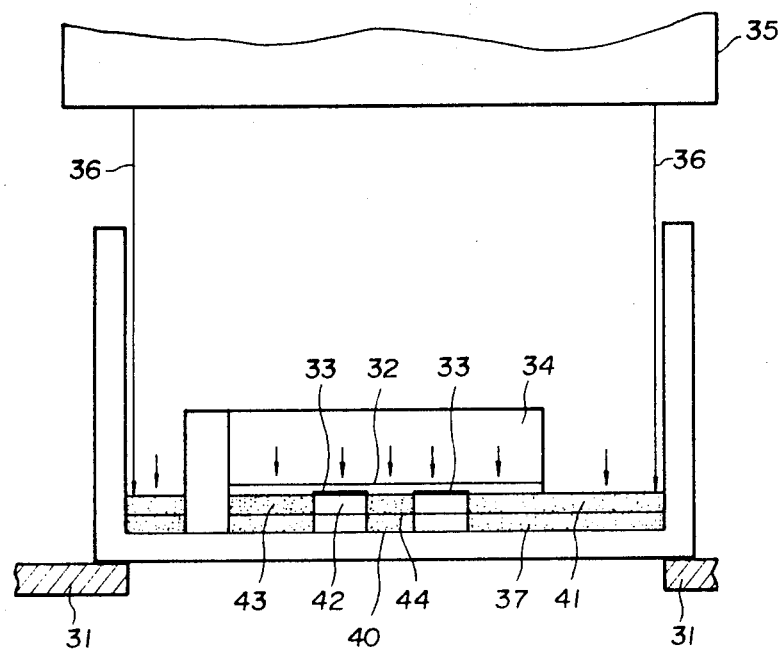

FIGS. 9a and 10a are sectional views showing sectional views of an apparatus which is being used for performing another preferred embodiment of the method of this invention. A jig device which is used for this process is described with reference to these drawings. 30 is a cast container for accomodating cast solution, 31 is a level for keeping the cast solution in the cast container 30 in horizontal orientation, 32 is a mask plate having a mask pattern 33, 34 is an L shaped fitting for positioning the mask plate 32, and 35 is an ultraviolet exposure device for producing parallel ultraviolet rays 36.

To produce a large size optical waveguide path, first the cast container 30 is washed in advance using for example methylene chloride $CH_2Cl_2$, and the L shaped fitting 34 for positioning which is also washed in advance is placed in the cast container 30. Next, a cast solution is placed in the cast container 30. The cast solution may consist of the same mixture as that of the first preferred embodiment.

The total volume of the cast solution is adjusted so that film thickness becomes 60 micrometers. The liquid surface is kept to be horizontal by adjusting the level 31.

Next, with a cast container 30 in a semi closed state, nitrogen gas is introduced for 150 minutes at the rate of 100 milliliters per minute, and after supplying MA vapor for thirty minutes a semi solid film 37 of a sheet configuration is formed by evaporating the solvent and part of the monomer.

Figure 9B:
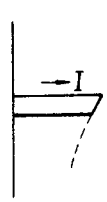
Figure 9C:
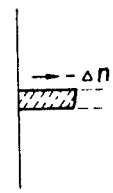

Next, the horizontal and vertical end surfaces of the mask plate 32 are closely contacted to the L shaped fitting 34 for positioning and are closely contacted to the film 37 with the mask surface 33 facing downwards. As the hardening of the film 37 advances and the mask plate 32 becomes slippable over the film 37, the ultraviolet exposure device 35 is activated and the ultraviolet light 36 is radiated for 15 minutes. The portion 38 which is masked by the mask pattern 33 of the mask plate 32 is not subjected to photopolymerization because the ultraviolet light does not radiate thereupon, and the PCZ and the MA turn into a separated state. However, the portion 39 which is not masked is subjected to photopolymerization and is polymerized. Specifically, a core portion 38 which is a high refraction index layer and a clad portion 39 which is a low refraction index portion are formed. In this case, the distribution of the intensity of ultraviolet light in the photopolymerization region of the film 37 is smaller toward the interior of the film as shown in FIG. 9b, but since the thickness of the film 37 is not so great there is not much attenuation, with the result that the distribution of the difference of refraction index is also substantially flat, as shown in FIG. 9c.

The first layer of a thin optical waveguide path 40 is thus formed as described above.

Then the mask plate 32 is removed and a cast solution is poured over the photopolymerized film 37 in the same way as in the case of FIG. 9, as shown in FIG. 10. The volume of the cast solution is adjusted also so as to make the thickness of the film to 60 microns. Thereafter, with the cast container 30 in the semi enclosed state, nitrogen gas is introduced for 150 minutes at the rate of 100 milliliters per minute, MA vapor is introduced for 30 minutes thereafter, and a semi solid film 31 of a sheet configuration is prepared by evaporating the solvent and part of the monomer.

Figure 10B:
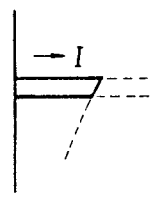
Figure 10C:
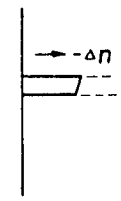

Thereafter, the mask plate 32 whose horizontal and vertical end surfaces are closely contacted to the L shaped metal fitting 34 for positioning is closely contacted to the film 41 with the mask pattern 33 facing downwards. When the mask plate 32 becomes slightly slippable over the film 41, the ultraviolet exposure device 35 is activated and the ultraviolet light 36 is radiated for 15 minutes. As a result, a portion 42 which is not subjected to photopolymerization and a portion 43 which is subjected to photopolymerization are generated on the film 41. In the case of this film 41, the distributions of the ultraviolet light intensity and refraction index difference are substantially flat as shown in FIGS. 10b and 10c.

Thus, the second layer of a thin optical waveguide path 44 is thus formed over the first layer of the thin optical waveguide path 40.

Next, after removing the mask plate 32, a third layer of a thin optical waveguide path (film thickness 60 micrometers) is formed over the second layer of the thin optical waveguide path 44, in the same way as in the cases of the first layer and the second layer.

Thus, the first to the third layers of the thin optical waveguide paths are laminated together, and a large size optical waveguide path with a film thickness of 180 micrometers is obtained.

After completion of the exposure, and after leaving it at room temperature for more than 30 minutes as a post process, the cast container 30 is transferred to a vacuum drier which is not shown in the drawing and is dried for about 10 hours. As a result, unpolymerized monomer in the core portions 38, 42, is removed. Next, the laminated film is peeled off from the cast container 30 and coating with a thickness of 10 micrometers is. formed on the front and the rear surfaces thereof with a low refraction index coating agent, and it is dried for five hours at 90° C. with a hot air drier to prepare clad layers 45 for upper and lower surfaces (see FIG. 11). Thus the manufacture of the large size optical waveguide path is completed.

Figure 11A:
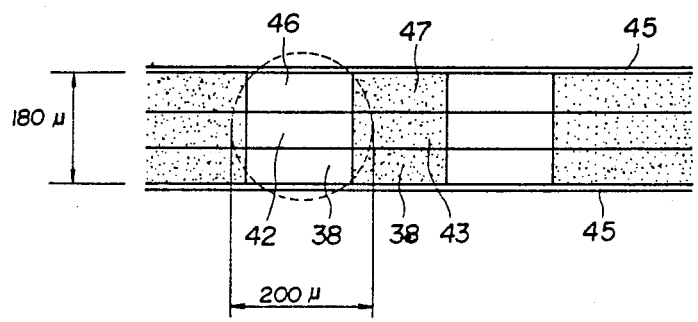
FIG. 11 in its view (a) shows a sectional view of a large size optical waveguide made according to this embodiment, and in its view (b) shows a distribution of refraction index difference along the depthwise direction.
Figure 11B:
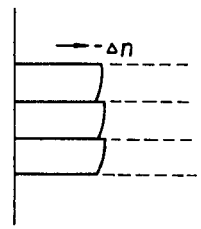

FIG. 11a is a sectional view of the large size optical waveguide path which was thus finished, and 38, 42, and 46 are core portions, 39, 43, and 47 are clad portions, and 45 is a clad layer. Thus completed 180 by 180 micrometer optical waveguide path may be connected or linked to an optical fiber with a diameter of 200 micrometers. Since the distribution of refraction index difference of this optical waveguide path is substantially flat as shown in FIG. 11b, there is no portion in the interface between the core portion and the clad portion which is small in refraction index difference, thereby producing a strong effect of confining light and further since scattering due to phase separation in the PCZ and MA is reduced, it becomes possible to increase the size (diameter) of the optical waveguide path by maintaining a large or high MA as compared to conventional optical waveguide paths.

In the above embodiment, the film was prepared by casting, but it is also possible to prepare it by making use of a centrifugal force of a spinner or the like.

And also in the above described embodiment a mask plate was used to perform selective photopolymerization, but it is also possible to selectively radiate laser light by scanning without using a mask plate.

In the above described embodiment, three layers of thin optical waveguide path were laminated together, but this invention is no way limited to this, and actually any number of layers greater than one may be laminated to form a large size optical waveguide path.

Figure 12:
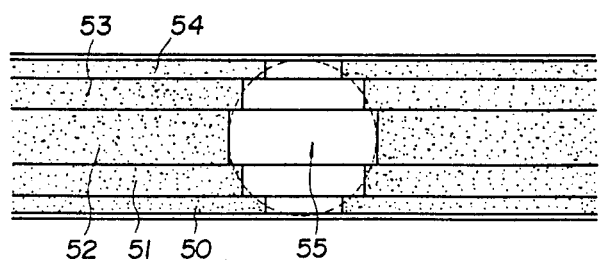
FIG. 12 is a sectional view of another optical waveguide which may be made according to this invention.

And also in implementing this invention, by changing the width of the optical waveguide paths of each layer 50, 51, ..... 54 as shown in FIG. 12 for instance by changing the widths of the master patterns for each layer, and by appropiately changing the film thickness of each layer 50, 51, .... 54, it is possible to obtain an optical waveguide path 55 which has a cross section of an approximately circular shape.

Although the present invention has been shown and described with reference to the preferred embodiment thereof, and in terms of the illustrative drawings, it should not be considered as limited thereby. Various possible modifications and alterations could be conceived of by one skilled in the art to any particular embodiment, without departing from the scope of the invention. Therefore it is desired that the scope of the present invention should be defined not by any of the perhaps purely fortuitous details of the shown preferred embodiment, or of the drawings, but solely by the scope of the appended claims, which follow.

What is claimed is:

1. An optical waveguide, comprising a material having (i) a reflective index which may be varied over an extent of the material according to a degree of photopolymerization to which the material is subjected and (ii) a selective photopolymerization over said extent of the material to create a refractive index of said material which has a substantially parabolic profile in both widthwise and depthwise directions across a cross-section of said material.

2. An optical waveguide comprising:
   an element formed of photopolymerized material and having a core portion of one refractive index profile and clad portions of another refractive index profile, said material being photopolymerized to produce a first refractive index profile for said core portion in a widthwise direction of said element which is a maximum at a center of the core portion and decreases towards a minimum at opposite widthwise sides of the core portion and a second refractive index profile in a depthwise direction of said element which is a maximum at the center of the core portion and decreases towards a minimum at opposite depthwise sides of the core portion.

3. An optical waveguide as in claim 2 wherein the first refractive index profile and the second refractive index profile from the center of the core in the widthwise direction and the depthwise direction of the element are substantially parabolic profiles.

4. An optical waveguide as in claim 2 wherein said element is formed by a plurality of photopolymerized film layers which are laminated together.

5. An optical waveguide comprising:
an element formed of photopolymerized material and having a core portion of one refractive index profile and clad portions of another refractive index profile, said material being phoyopolymerized to produce said one refractive index profile for said core portion in which a difference in refractive index in a depthwise direction is approximately constant, said element being formed of a plurality of laminated layers of said material, with a waveguide payh being defined along a line parallel to a plane of the layers.

6. An optical waveguide as in claim 5 wherein said of photopolymerized layers of photopolymerized material have respective core portions of different widthwise dimensions which, when said layers are laminated, produces a core portion for said element having an approximated circular cross-section.

* * * * *